United States Patent [19]

Golder

[11] Patent Number: 5,335,957
[45] Date of Patent: Aug. 9, 1994

[54] RESTRAINT DEVICE

[76] Inventor: Thomas J. Golder, 3421 Highview Rd., Charlotte, N.C. 28210

[21] Appl. No.: 893,897

[22] Filed: Jun. 4, 1992

Related U.S. Application Data

[63] Continuation of Ser. No. 669,036, Mar. 14, 1991.

[51] Int. Cl.$^5$ ............................................. B60R 22/00
[52] U.S. Cl. ..................................... 297/482; 297/483
[58] Field of Search ............... 297/483, 482, 487, 488, 297/467

[56] References Cited

U.S. PATENT DOCUMENTS

| | | | |
|---|---|---|---|
| 3,713,693 | 1/1973 | Cadiou | 297/482 |
| 3,819,230 | 6/1974 | Bloom | 297/488 |
| 3,941,159 | 3/1976 | Toll | 24/442 |
| 3,945,678 | 3/1976 | Neuman | 297/488 |
| 3,957,282 | 5/1976 | Finnigan | 297/482 |
| 4,067,608 | 1/1978 | Von Wimmerspeg | 297/488 |
| 4,341,422 | 7/1982 | Cunningham | 297/488 |
| 4,502,732 | 3/1985 | Williams | 297/488 |
| 4,671,574 | 6/1987 | Kassi | 297/488 |
| 4,765,685 | 8/1988 | Sudoh et al. | 297/488 |
| 4,872,725 | 10/1989 | Hakeem | 297/488 |
| 4,886,318 | 12/1989 | Pennock | 280/808 |
| 4,944,530 | 7/1990 | Spurrier | 280/801 |
| 5,005,866 | 4/1991 | Reedom | 297/482 |
| 5,178,439 | 1/1993 | McCracken | 297/483 |

FOREIGN PATENT DOCUMENTS

| | | | |
|---|---|---|---|
| 2729319 | 1/1979 | Fed. Rep. of Germany | 297/487 |
| 2856167 | 7/1980 | Fed. Rep. of Germany | 297/487 |
| 3019153 | 12/1981 | Fed. Rep. of Germany | 297/487 |
| 3434010 | 6/1986 | Fed. Rep. of Germany | 297/482 |
| 3501747 | 9/1986 | Fed. Rep. of Germany | 280/801 |
| 7615095 | 1/1987 | France | 297/488 |

Primary Examiner—Kenneth J. Dorner
Assistant Examiner—Cassandra Davis
Attorney, Agent, or Firm—Bell, Seltzer, Park & Gibson

[57] ABSTRACT

An improved restraint device is provided which is characterized by its relative ease of use and comfort to occupants while providing effective and enhanced protection to occupants of motor vehicles or the like. The restraint device includes an open ended tubular guide member which is generally cylindrical or elliptical in cross-section and in which the interior surfaces of the tubular member define a longitudinal passageway for receiving and engaging portions of both the shoulder harness and lap portions of a three-point vehicular restraint system. The guide member exerts a laterally displacing force on the shoulder harness portion of a three-point restraint system to re-orient the shoulder belt for use by adults of relatively small stature or children. In this manner, the repositioning of the shoulder belt for use by children in particular may be accomplished without adversely displacing the relative position of the lap belt particularly during impact conditions. The advantages of the restraint device are accomplished without adversely affecting the automatic adjustment capabilities of the existing automotive restraint apparatus or without requiring extensive modifications to the existing restraint.

10 Claims, 4 Drawing Sheets

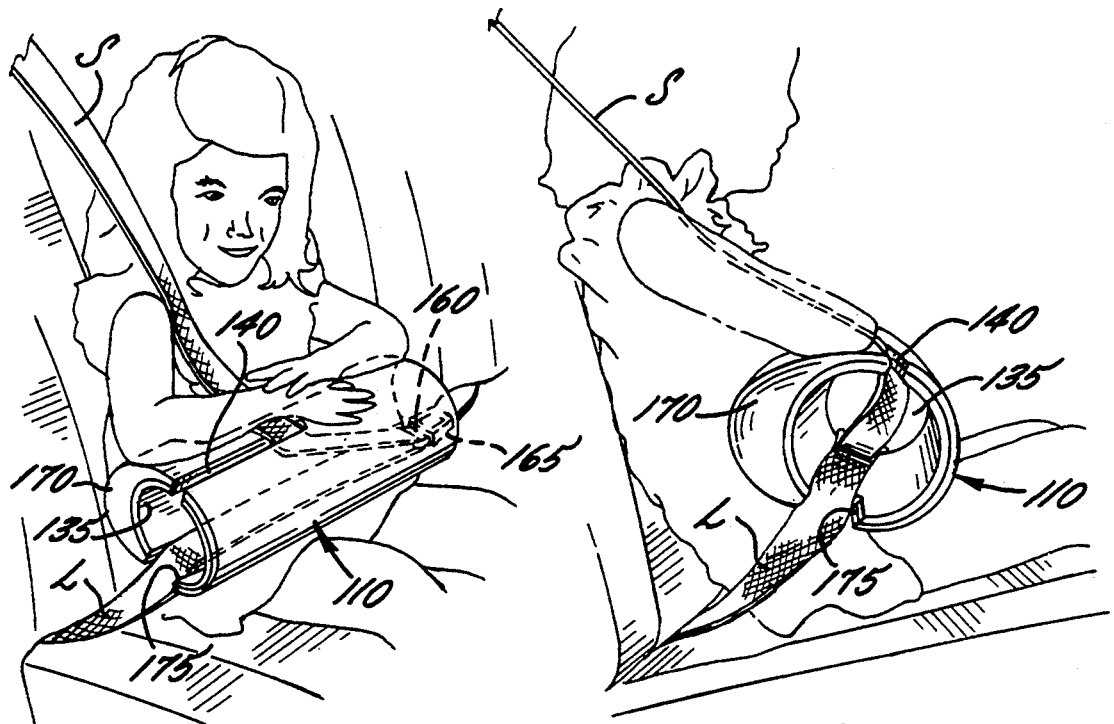
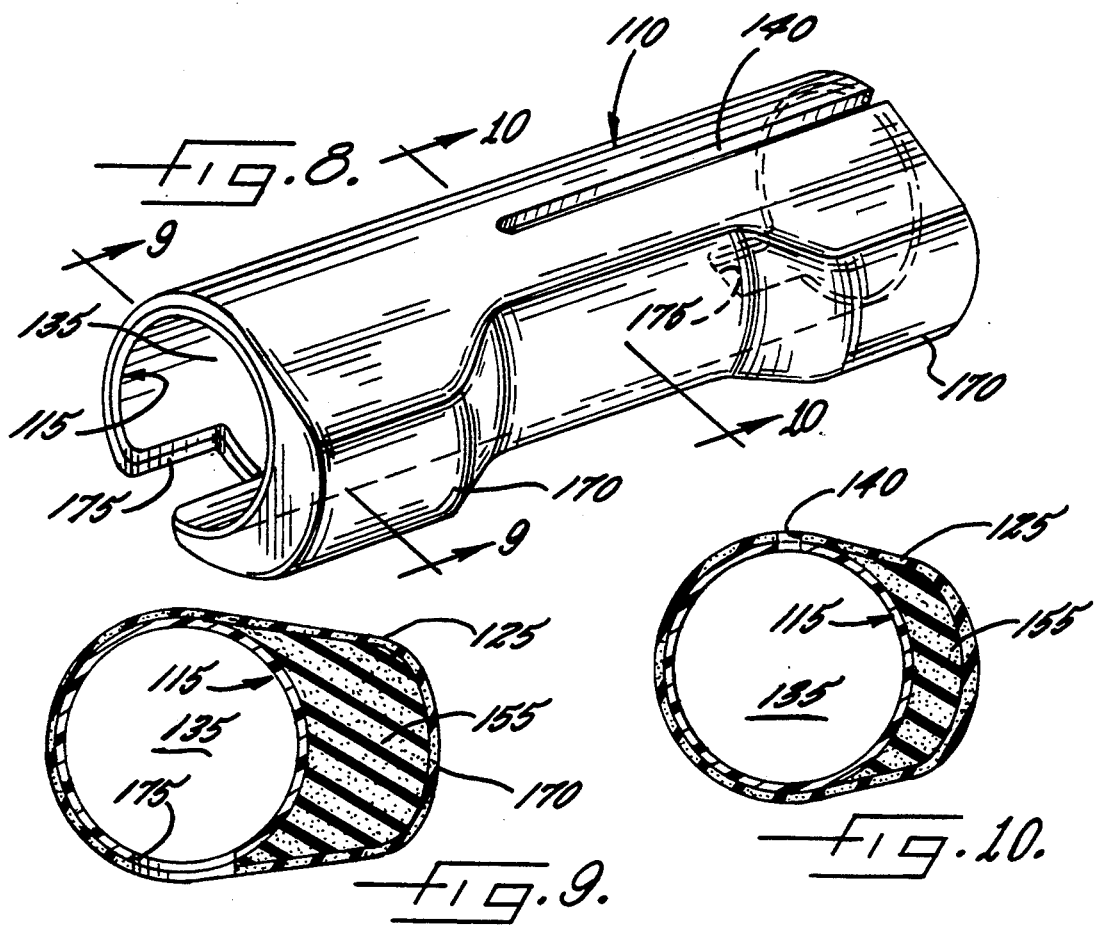

RESTRAINT DEVICE

This application is a continuation of application Ser. No. 07/669,036, filed Mar. 14, 1991.

BACKGROUND OF THE INVENTION

This invention relates to a restraint device which is designed for use in combination with conventional automobile safety belt or similar web-type restraint systems. The conventional restraints are designed primarily for use by adults of "average" size, but are routinely used in fact by adults of relatively smaller stature or by young children. As a result, there is a substantial existing need for a relatively simple but effective device for adapting conventional web-type restraint systems for more effective use by individuals including children of varying size.

Literally generations of individuals in this country have grown accustomed to the routine of sitting down in the family automobile and inserting the hasp of the seat belt into the catch or clasp. Despite the more recent focus on the desirability of air bags as a restraint system, the conventional seat belt, and the three-point restraint system in particular, remains the predominant restraint system in use today and for the foreseeable future. And, while the three point restraint system has greatly enhanced the safety of automotive travel over the use of a lap belt alone, these systems are not designed for use by persons of varying stature due to practical or regulatory limitations.

In response to the still alarming number of serious injuries or fatalities and particularly those involving young children, an increasing number of states have moved in recent years to enact laws which mandate the use of safety belts by adults and specially designed auxiliary carriers by children. Many of the specially designed child carriers are designed for use by children up to about 40 lbs. in weight while it would be desirable to encourage use of specially designed restraints by children up to at least about 8 years of age. On the other hand, older children simply refuse to use specialized seats such as booster seats as they get older and often prior to age four.

An additional dilemma arises when children travel by air with their families. Even young children routinely fly without using any specialized restraint whatsoever. In response to the alarming number of juvenile fatalities in airline crashes where the adult parents have survived, the National Transportation Safety Board has recently indicated that restraints will be required in the future for all children traveling with their parents on domestic flights. Unfortunately, parents travelling by air with small children are already required to transport what seems to be an endless mound of miscellaneous child-related paraphernalia which, with the addition of a full-size car seat, will leave many parents to simply abandon air travel as an alternative. Accordingly, there also exists a need for a compact device which can be used to restrain the child but which is lightweight and easily transportable for limited use where the protection of a larger car seat, for example, is not required.

Various devices have been suggested over the years for modifying web-type restraint systems such as the conventional system used in automobiles. Most of these devices are designed specifically to modify the shoulder harness of the combination shoulder and lap restraint or "three point" seat restraint as it is commonly known. Curiously, these attempts are virtually all addressed to modifying the restraint— not for purposes of safety— but to avoid wrinkling the apparel worn by adult occupants. Representative examples include U.S. Pat. Nos. 4,609,205 to McKeevet and 4,832,367 to Lisenby for strap-like members which modify the vertical run of the shoulder harness. Devices of this type have a fundamental flaw when viewed from a safety standpoint. The dynamic forces resultant from a high speed impact (20 G's, for example) will likely cause devices that link the shoulder belt to the lap belt to pull the lap belt portion upward into the abdominal viscera, causing possible internal injury or submarining by the occupant under the lap portion of the restraint. The readily releasable nature of the Lisenby straps which use Velcro presents an additional problem with the security of the device under these same conditions which are customarily experienced during an impact.

Other approaches for modifying shoulder harnesses involve the use of auxiliary strap systems such as depicted, for example, in U.S. Pat. Nos. 4,236,755 to Pollitt et al. and in 4,289,352 to Ashworth in which a plurality of straps are provided for the purpose of augmenting the conventional three-point systems for use with persons of smaller stature. These devices require permanent modifications to the existing restraints, however, or are so complex that many adults would prefer to solve a Rubik's Cube ® puzzle than to attempt to deploy such a system in their automobiles.

Simplified shoulder belt adjusters are depicted in U.S. Pat. Nos. 4,786,078 to Schreier et al. and in 4,796,919 to Linden. These devices are substantially simpler than the devices depicted in Pollitt et al. or Ashworth, but still possess shortcomings of their own. The FIGURES in the Linden patent, for example, reveal that while the resulting adjustment to the vertical run of the belt appears desirable, the lap belt portion of the three-point system is spaced away substantially from the child's abdomen as shown and at a relative position which is elevated in relation to the lap area. Consequently, under conditions of an actual impact or a hard stop, the soft flesh in the child's abdominal area again may be exposed to extreme forces which unnecessarily increase the likelihood of possible internal injuries. In addition, the vertical run of the restraint system or shoulder harness can only be modified in systems where the entire vertical run of belt is accessible whereas most conventional restraint systems have concealed retractors. For example, all rear seats have concealed retractors which would render the device useless in this environment. In a related vein, both the Linden and Schreier, et al. devices adversely affect the automatic adjustment capabilities of the restraint system since one or more of the runs of the web restraint are restricted.

As the representative prior art itself reflects, and as the parent or grandparent of any young child can attest, there is a substantial need in the marketplace for a simplified restraint device which is effective to maximize the safety aspects of conventional systems when used by adults of relatively small stature or by children. There is also a related need for a restraint device which can be easily transported from one vehicle to another, which is lightweight, comfortable for the adult occupant or child, and which can be easily used in combination with conventional seat belt retractor systems by young and old alike. A portable device is also desired for use in solving the distinct need presented for airline travelers and especially if the regulations proposed by the National Transportation Safety Board are adopted. If sufficiently lightweight devices can be achieved, the airlines themselves may elect to provide such restraints for use by their passengers as an additional service.

SUMMARY OF THE INVENTION

In order to achieve these and other objects, a restraint device is provided which is characterized by its relative ease of use and comfort to the occupant, while at the same time providing effective and enhanced protection which is of paramount importance. In accordance with the invention an open-ended tubular guide member is provided which is preferably generally circular or elliptical in cross section and in which the interior surfaces of the tubular member define a longitudinal passageway which is adapted for receiving and engaging both the shoulder harness and lap portion of a three-point restraint system securely within the guide member.

In automobiles where the three-point restraint system is used, the guide member exerts a lateral displacing force on the shoulder harness portions which modifies the orientation of the vertical run to maximize the benefits from its use without also adversely affecting the desirable low positioning of the lap belt to maximize both safety and comfort. The ease of use encourages proper use of the restraint system by adults and children alike. Optionally, in a portable embodiment, the restraint is of such design and materials so as to provide a conforming fit to the body and may be selectively padded for added comfort and protection especially with smaller children. This may also assist in dissipating forces exerted by impacts from a collision or those forces generated in sudden stops.

In accordance with a particularly preferred aspect of the invention, a shoulder belt guide is additionally provided in the form of a channel in the tubular guide member which may be adjustable for selectively modifying the vertical run of the shoulder harness and positioning it for optimal use with smaller adults or with children of varying sizes. These features may be provided either through a permanent installation as part of the three-point restraint or in a portable embodiment whereby it can be conveniently transferred to other automobiles, and in this application, is especially adaptable for use with existing restraint systems in automobiles without requiring complex or extensive modifications to the automobile or the restraint.

BRIEF DESCRIPTION OF THE DRAWINGS

Additional features of the invention will be described hereinbelow in conjunction with the accompanying drawings in which:

FIG. 6 is a perspective view depicting an alternative embodiment of the present invention depicted in use in the back seat of an automobile;

FIG. 7 is an additional side perspective view of the embodiment of FIG. 6 and depicting the interior passageway defined by the tubular guide member of the portable restraint device in accordance with one aspect of the present invention;

FIG. 8 is an additional top perspective view of the embodiment shown in use in FIGS. 6 and 7 and particularly depicting lobed end portions provided on a padded member as additional features in accordance with additional optional aspects of the present invention;

FIG. 9 is a transverse sectional view taken substantially along line 9—9 of FIG. 8;

FIG. 10 is an additional transverse sectional view taken substantially along the line 10—10 of FIG. 8;

DESCRIPTION OF THE PREFERRED EMBODIMENTS

Figure 1:
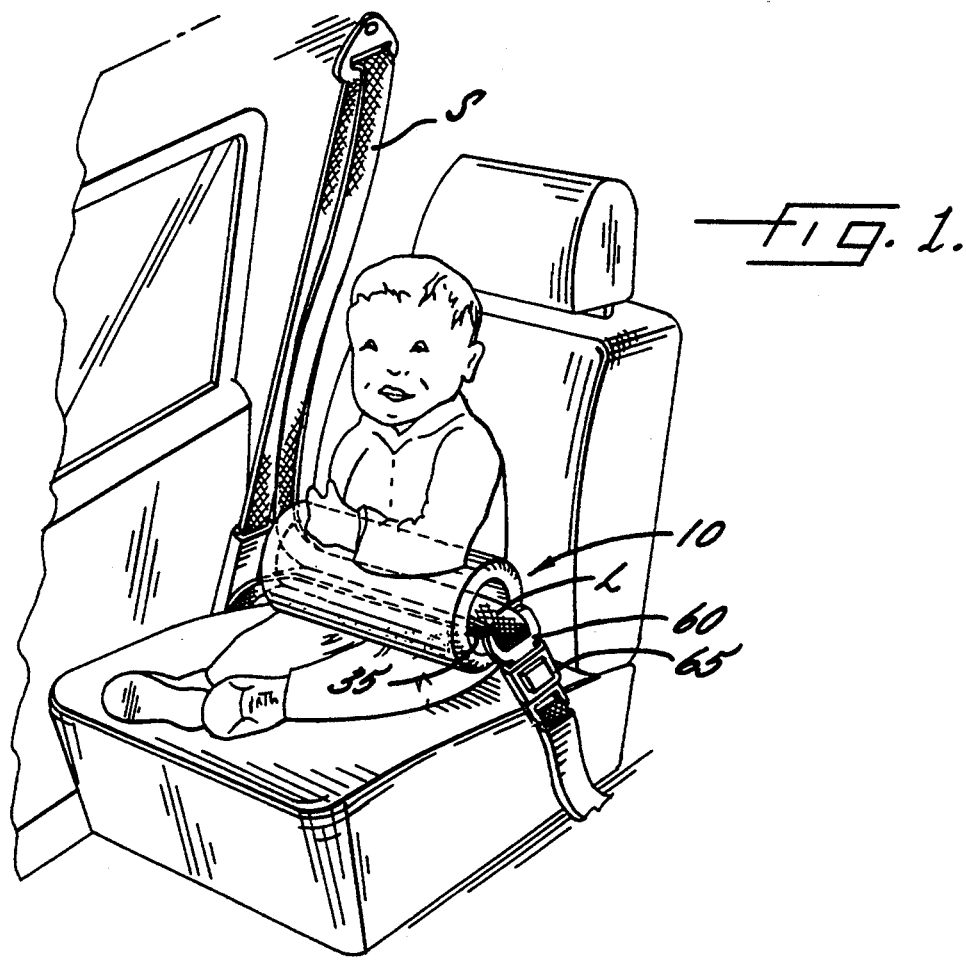
FIG. 1 is a side perspective view of a first embodiment of a restraint device in accordance with one aspect of the present invention and depicting its use with a child in an automobile or similar seat.
Figure 2:
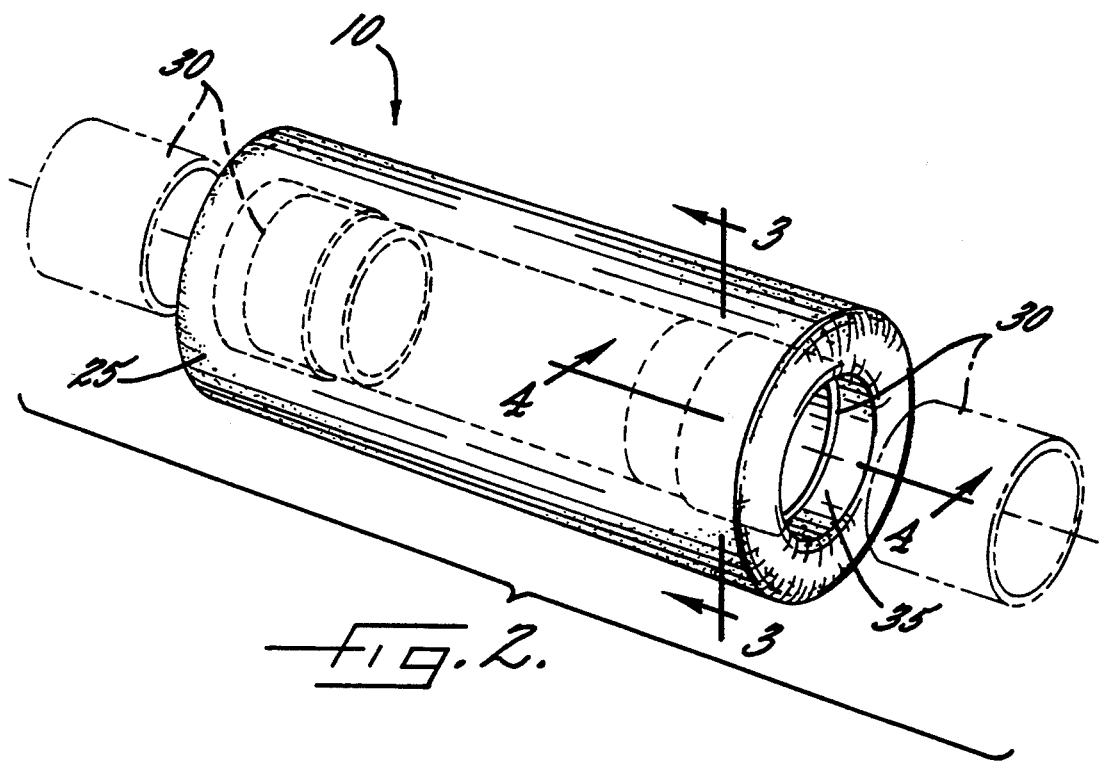
FIG. 2 is an exploded perspective view of the embodiment depicted in FIG. 1 wherein the tubular guide member is of cylindrical construction and wherein the device is of integrated construction in accordance with an additional aspect of this invention.

As shown in FIG. 1 a restraint device 10 according to the present invention may be configured to fit snugly across the lap of a young child and requires no physical modification to the existing restraint system in the automobile. The particular system depicted in FIG. 1 is representative of conventional three-point web-type restraint systems in which a vertical run and a horizontal run are combined to provide a shoulder harness S and lap belt L from the same length of webbing. In restraint systems of this type the hasp 60 is customarily received in a closure 65 of known type and is releasably secured therein.

Figure 3:
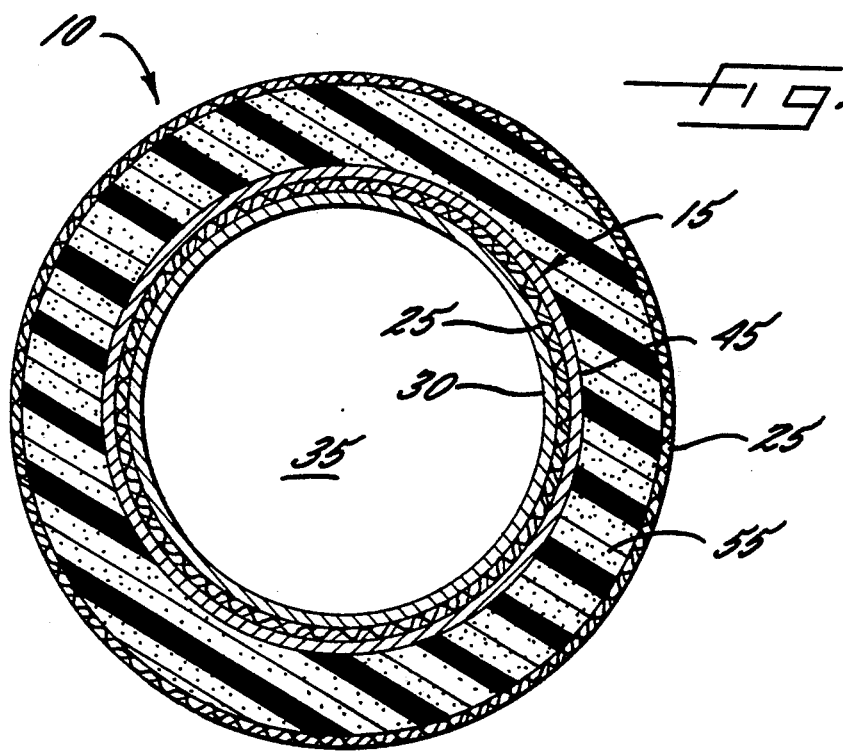
FIG. 3 is a transverse sectional view of the auxiliary restraint device of the particular embodiment shown in FIG. 2 and taken substantially along the Line 3—3 of FIG. 2.
Figure 4:
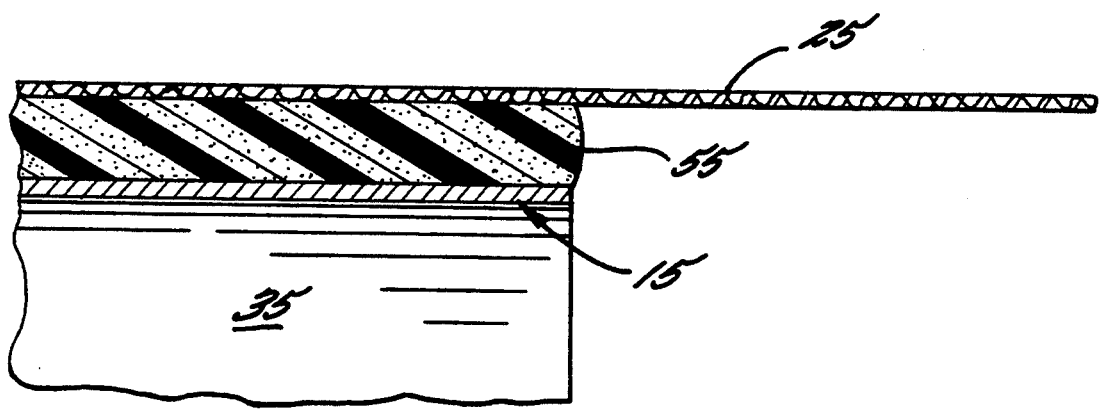
FIG. 4 is an additional transverse sectional view taken substantially along the line 4—4 of FIG. 2 and depicting a step in the assembly of an embodiment of the invention as particularly shown in that illustration.
Figure 5:
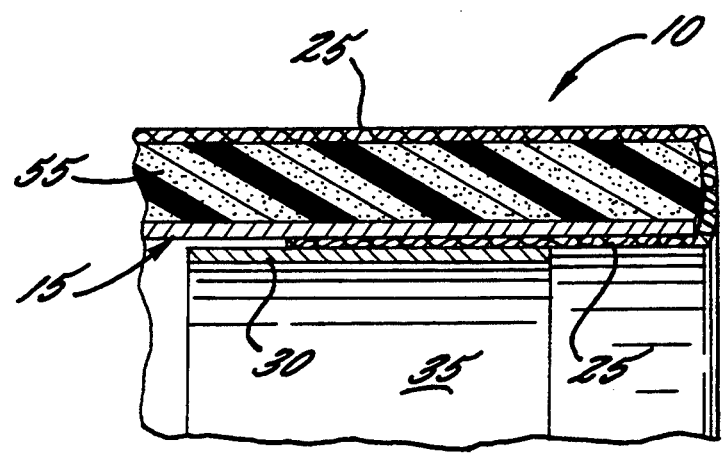
FIG. 5 is an additional perspective view depicting a further step in completing the simplified assembly of the embodiment as shown in FIG. 2.

The first embodiment as shown in FIG. 1 includes an elongate hollow tubular guide member or core 15 (FIG. 3) which includes an exterior body surface 45 and which is open at both ends. The tubular guide member 15 defines an interior passageway 35 (FIG. 3). The interior passageway 35 of the tubular guide member 15 serves as a conduit for the webbing of the conventional restraint system including both the shoulder harness and the lap belt. In the first embodiment as shown, the passageway 35 is circular in cross-section in view of the perfectly cylindrical construction of the tubular guide member 15. The cross-sectional shape of the tubular guide member 15 and of the longitudinal passageway 35 may be varied in accordance with this invention and may deviate from a common plane along its length. Accordingly, when used herein the term "tubular" is not restricted to articles that are cylindrical in cross-section, and, in accordance with this invention, the guide member may be selected from a variety of cross-sectional shapes. In addition, the phrase "tubular guide member" as used herein also refers to flexible resilient materials as shown for example in FIGS. 11 and 12 and wherein tubular is used in its broadest possible sense to include any shape which defines an interior conduit or tunnel, for example, for completely enclosing portions of both the shoulder harness and the lap belt in a three-point system.

The guide member 15 may be fashioned from any number of starting materials including, for example, spirally wound paper cores having high impact strength, blow-molded, rotationally molded, or injection molded plastic, for example, or may be dip-molded to match other components of the interior of the automobile. The guide member may also be formed of relatively flexible, resilient materials such as leather, nylon, vinyl or fabric materials and which may include flame retardant fabrics such as fabrics made from KELAR TM fibers, for example.

The restraint device may optionally include a padded member 55 which extends generally radially outwardly from the exterior body 45 of the tubular guide member 15, for example. The padded member 55 and the tubular guide member 15 may be of unitary construction where the product is injection or rotationally molded, for example. In the particular embodiment as shown in FIGS. 2-5, however, the pad means 55 is depicted as a layer of synthetic foam which can be cut to length and fitted around the tubular guide member 15 in accordance with one aspect of the invention to provide for simplified assembly. The pad means 55 may be of any suitable material but preferably comprises conventional foam materials, which may be of the open or closed cell type and which are lightweight and resilient. In an integrated construction, the foam material is preferably subjected to compressive forces to increase the relative density of the foam without added expense to improve the relative padding effect to enhance its comfort especially where the tubular guide member 15 is of relatively stiff construction. Microcell cross-linked polyethylene or urethane materials of about one inch in thickness may be used as preferred padding materials. An air-filled bladder may also be used in the alternative.

In accordance with a simplified method of manufacture, a fabric sleeve 25 is additionally provided and which is used as the primary means for joining the individual elements in the particular integrated construction. In accordance with this simplified form of construction, the foam material 55 is wrapped around the tubular guide member or core 15 and may be temporarily held in place by tape or by a layer of MYLAR TM film for example. Alternatively, the foam layer may be adhesively secured to the core. The tubular guide member mounting the foam may then be inserted in the fabric sleeve 25, adjacent to the foam layer 55 (FIG. 4), and is preferably dimensioned so as to provide excess fabric extending beyond the outer terminal ends of the tubular guide member 15 and the pad or foam 55 for ease of assembly. Suitable dimensions may be 22 inches in width and 21 inches in length for the external sleeve where a 4.25 inch diameter core 18 inches in length is used and where a 1 inch thick foam layer is employed.

Also in accordance with the simplified assembly method of the first embodiment, the outer ends of the fabric sleeve 25 may be folded over the end of the restraint and the ends of the foam and thereafter tucked inside the longitudinal passageway 35 in the tubular guide member 15. At least one insert collar 30, and preferably two in order to minimize the fabric requirements, may then be inserted in each end of the longitudinal passage 35 (FIG. 2) and by the resulting frictional engagement presses the ends of the fabric into frictional engagement with interior surfaces of the guide member or core 15 and thereby maintain the elements in relative fixed position to each other. This particular construction has the advantage that the insert collars 30 may later be removed if desired to permit for separate laundering of the fabric sleeve. If this construction is adopted, it is particularly preferred to interpose an additional layer of MYLAR TM or other material (not shown) or to secure the pad means by adhesive to the base member 15 to facilitate the disassembly and reassembly of the auxiliary restraint. apparatus 10 by the end user. Of course the insert collars 30 are dimensioned relative to the interior diameter of the core 15 and the particular thickness of the fabric sleeve 25 so as to permit the collar to be inserted in the end of the core while achieving a snug engagement against the interior surface. Where the interior diameter of the base member is approximately 4.25 inches, an inside diameter for an insert collar of 3.5 inches has been discovered to be suitable where the thickness of the spirally wrapped core material is approximately 0.125 inches thick as depicted.

As an alternative to the use of the insert collars 30, the fabric sleeve 25 may be so dimensioned as to extend into the interior passageway 35 in a manner that permits the opposed terminal ends of the sleeve to overlap each other inside the passageway. By this expedient adhesive may simply be provided on one of the overlapping edges and the sleeve bonded in place. Alternatively, releasable means joining the overlying surfaces of the sleeve may be provided, such as by Velcro ® hook and latch means, again to provide for removal of the sleeve 25 in applications where laundering of the unit is desired.

The fabric sleeve is preferably formed of a material which has high frictional characteristics so as to cooperate with the apparel worn by a child or the like or to maintain snug engagement therewith to additionally aid in avoiding "submarining" which can occur with modified devices such as those in the prior art where the shoulder belt acts on the lap belt in a way that permits the child to literally slide under the seat restraint.

While a generally circular cross-section for the tubular guide member may be used, it is desirable to insure as snug a fit as possible against the lap and torso of the child. To this end, additional features of the invention, as shown for example in FIGS. 6-10, may be provided. As shown therein, and in accordance with a second preferred embodiment 110, the pad means 155 in this construction includes enlarged lobed end portions 170 which are contoured to ensure a snug fit against the iliac crest of the child on either side thereof. Of course the tubular guide member 115 may itself be provided with unitary lobed ends in a molded construction as one equivalent of this alternative construction of the invention. In any event, the particular embodiment as shown in FIGS. 6-10 also utilizes an integrated construction including an outer sleeve 125 which may be of stretch neoprene material, such as the type used in skin diving gear which permits limited selective positioning of the particular cushioned lobes 170 along the length of the restraint device for adjustment purposes to provide a custom fit and further avoid lateral shifting.

An additional aspect of this invention is also shown in connection with the embodiment of FIGS. 6-10. Here, the opposed terminal ends of the tubular guide member additionally include lap belt guide notches 175 on either side thereof which receive portions of the belt which, in this embodiment, may be pulled completely through the interior passageway 135 of the tubular guide member using the hasp 160 and then received in the belt closure 165. This arrangement should serve to further reduce the degree of possible inadvertent rotation of particularly guide members of cylindrical construction in cross-section under very extreme impact conditions. In addition, the notches 175 also serve to hold the restraint device in snug anti-shifting engagement with the iliac crest of the occupant and otherwise improves the snug nature of the fit against the body of the child for example.

In accordance with a further particularly preferred aspect of the present invention, and as shown for example in FIG. 8, shoulder belt guide means 140 may optionally be provided in the restraint device 110 and preferably as a slit or channel through the tubular guide member 115. In this manner, portions of the vertical run or shoulder restraint S of the three-point system will extend into the channel 140 and thereby adapt the shoulder harness for use by a child, for example, but while preferably additionally retaining the advantages of a relatively enlarged surface area the restraint across the torso of the child. Furthermore, and significantly, this arrangement provides for a positive lateral displacement of the shoulder harness S as the basis for adjusting the position of the restraint. This should be distinguished from the prior art methods which rely on interconnecting the shoulder harness S and lap belt L portions together by strap members or by fasteners for example, which creates tension between these members and tends to displace the lap belt in a vertical direction under impact conditions. Accordingly, in accordance with the present invention, portions of the both the shoulder belt S and the lap belt L segments of the restraint are received within the longitudinal passageway 135 defined by the tubular guide member 115 but without fixedly fastening the two members together as in the prior art to facilitate automatic adjustment by the existing restraint.

Figure 11:
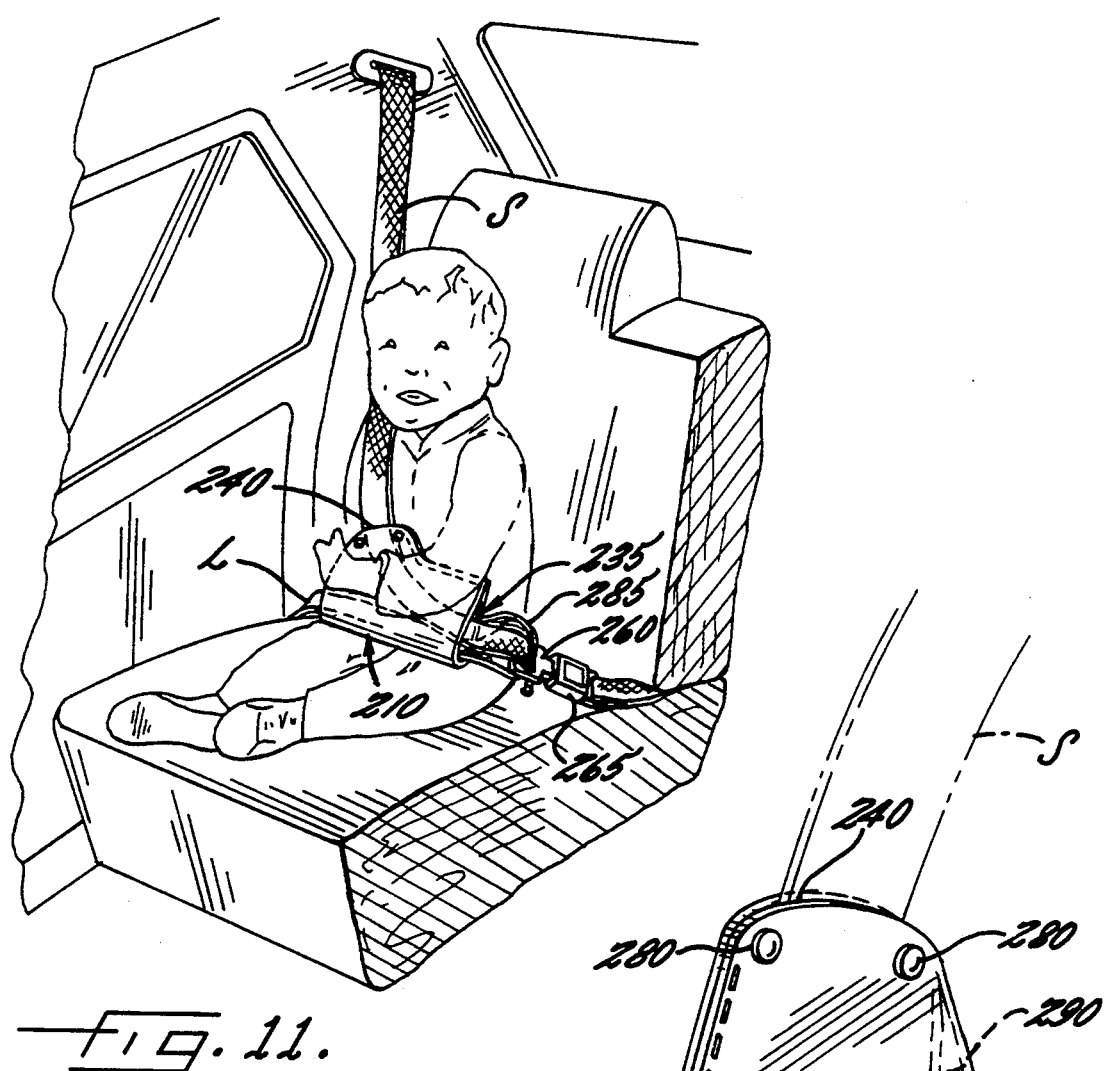
FIG. 11 is a side perspective view of a particularly preferred embodiment of the present invention depicted in use with a child in an automobile which includes an adjustable shoulder belt guide channel in accordance with a preferred aspect of this invention, and wherein the tubular guide member is of resilient collapsible construction to allow a more conforming fit about the iliac crest of the user.
Figure 12:
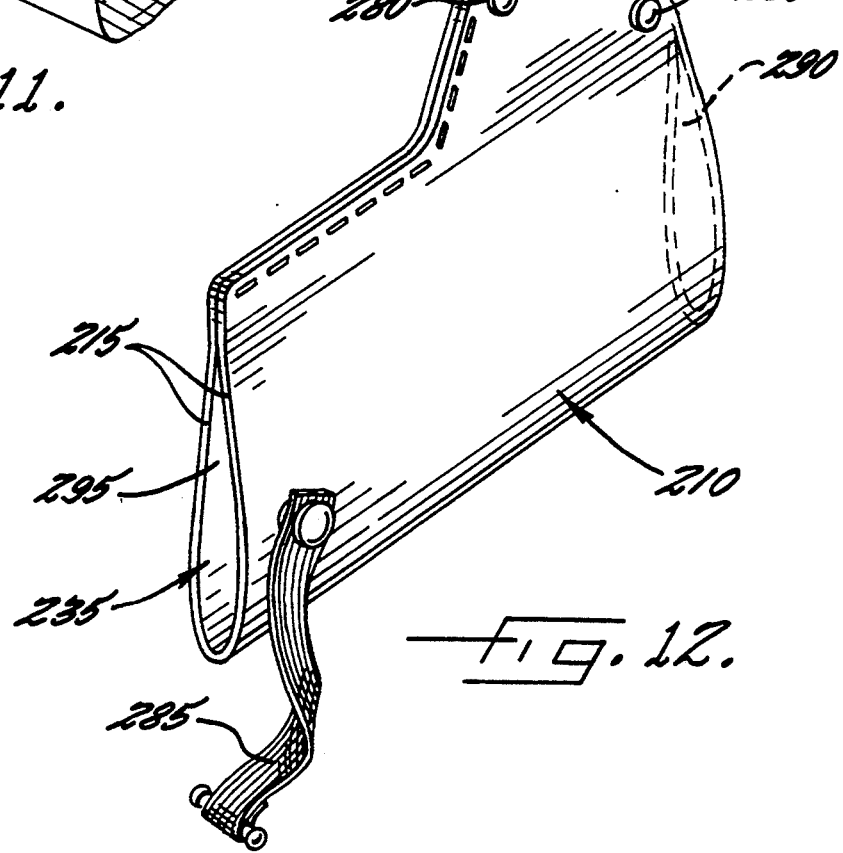
FIG. 12 is an additional perspective view depicting the embodiment of FIG. 11.

In accordance with an additional embodiment of the restraint 210, as shown in FIGS. 11 and 12, the tubular guide member 215 may be formed of relatively flexible but resilient material which is collapsible for ease of storage, and to promote a fit conforming closely to the hips of the occupant. This particular preferred embodiment is especially suited for use with either adults or children and especially children who resist the use of any type of auxiliary device except those deemed least "intrusive" in their view. Surprisingly, in view of its simplified construction, this embodiment has proven very effective in simulated vehicle crash tests even under extreme forces. In this embodiment the shoulder belt guide means includes a channel 240 and releasable rivets or screws 280 which may be used to adjust the position of the shoulder belt for use by individuals of varying stature.

In this particular illustrated embodiment of the restraint the tubular guide member 215 serves to dissipate forces from the relatively narrow cross-section of the seat belt across a larger surface and re-directs forces onto the stronger skeletal frame of the occupant. The length of the restraint device may be varied in all embodiments but is preferably sufficient to extend across a substantial portion of the iliac crest of a small child and as shown in FIGS. 11 and 12 has a length of approximately 8 inches, a height of approximately 6 inches at the inlet end 290, and a height of approximately 4 and one-half inches at the outlet end 295 with a diameter of approximately 3.25 inches.

Regardless of the particular dimensions which are selected for the restraint, it is particularly preferred that the effective interior diameter of the longitudinal passageway 35, 135, or 235 defined by the tubular guide member be greater than the width of the conventional lap restraint L (generally about one and three-quarters inches) and preferably at least approximately one and one-half times this width at especially the inlet end 290 of the passageway 235 so as to preferably encompass both the shoulder and lap belt portions within the interior of the longitudinal passageway 235, for example, but in lateral slightly spaced apart relation to each other as shown in FIG. 11, for example. This ensures that the forces acting on the shoulder harness portion S of the existing restraint within the channel 240 will serve to laterally displace the shoulder member rather than fixedly binding the lap and shoulder harness portions together in direct overlying relation to one another at the torso of the occupant, as in the prior art. This latter arrangement does not comply with existing Federal regulations for automotive restraints of this type and restricts the automatic adjustment capabilities of the restraint.

The materials used in accordance with the last illustrated embodiment may include multi-component reinforced tubular material of the type used as hoses by fire fighters but may effectively be constructed from leather or other materials including plastics, which have excellent resilience properties. The restraint may also include a tether 285 for releasably securing the restraint to the hasp or closure of the automobile to avoid loss.

As should be apparent from the foregoing discussion, the present invention overcomes many of the shortcomings associated with known prior art devices designed supposedly for similar application, but which do not meet the requirements for an effective restraint. As described herein, the restraint of the present invention is easy to use but highly effective in protecting occupants and especially children from experiencing serious injury in automotive accidents by incorporating sound biomechanic principles. While the restraint has been illustrated as a portable restraint, the same elements may be incorporated as original equipment in an automobile for example which may involve reducing the relative size of the restraint as shown.

It should be understood that the foregoing drawings and specification are presented for purposes of describing the preferred embodiments only, and that they should not be utilized at all for purposes of unduly limiting the scope of the present invention, which scope is defined solely by the appended claims as presented hereinbelow.

That which is claimed is:

1. An automotive restraint adjustment device for use with an existing conventional web-type restraint system of a type which includes a lap belt web portion and a shoulder belt web portion, a hasp member connected to said lap belt web portion and to said shoulder belt web portion, and a hasp closure for engagingly receiving the hasp member, said restraint adjustment device comprising a tubular guide member having an exterior surface which is completely and non-releasably closed about its periphery along a substantial portion of its length, open ends defining an inlet and an outlet for said tubular guide member, and an interior passageway extending between the inlet and outlet of said tubular guide member, said automotive restraint adjustment device additionally comprising shoulder belt guide means extending through exterior surfaces of the tubular guide member in generally parallel relation to said interior passageway to provide an open channel for receiving the shoulder belt web portion of the existing web-type restraint system and whereby the hasp of an existing web-type restraint system may be removably inserted in the inlet of said tubular guide member and conveyed through said interior passageway to said outlet while the shoulder belt guide means displaces the relative position of the shoulder belt web portion of the restraint as the hasp is conveyed through the interior passageway and whereby the lap belt web portion and the shoulder belt web portion will be positioned in laterally spaced apart relation to one another within said interior passageway.

2. A restraint adjustment device according to claim 1 further comprising lap belt guide notches in association with the respective ends of said tubular guide member for receiving and engaging portions of a lap belt when threaded through the interior passageway.

3. A restraint adjustment device according to claim 1 further comprising pad means extending radially outwardly from said tubular guide member, said pad means additionally including lobed end portions positioned adjacent each respective end of said tubular guide member to provide a contoured cushioned surface about the iliac crest of an occupant.

4. A restraint device according to claim 1 wherein said inlet end is substantially larger than said outlet so that the hasp of a conventional restraint system may be easily received in said inlet and conveyed through said interior passageway.

5. A restraint adjustment device according to claim 1 wherein said tubular guide member is formed from flexible, resilient material.

6. A restraint adjustment device according to claim 5 further comprising shoulder belt guide adjustment means for adjusting the effective length of the channel.

7. An automotive restraint adjustment device according to claim 1 wherein said restraint is of unitary construction.

8. An automotive restraint adjustment device according to claim 1 wherein said tubular guide member is formed from flexible, resilient material.

9. An automotive restraint adjustment device according to claim 1 further comprising shoulder belt guide adjustment means for adjusting the effective length of the channel.

10. An automotive restraint adjustment device according to claim 1 wherein said inlet has a larger diameter than said outlet.

* * * * *

UNITED STATES PATENT AND TRADEMARK OFFICE
CERTIFICATE OF CORRECTION

PATENT NO. : 5,335,957
DATED : August 9, 1994
INVENTOR(S) : Thomas J. Golder

It is certified that error appears in the above-identified patent and that said Letters Patent is hereby corrected as shown below: On the title page item [56]
Under REFERENCES CITED, please insert:

| | | | |
|---|---|---|---|
| 4,236,755 | 12/1980 | Pollitt, et al. | 297/483 |
| 4,289,352 | 9/1981 | Ashworth | 297/473 |
| 4,609,205 | 2/1986 | McKeever | 280/808 |
| 4,786,078 | 11/1988 | Schreier, et al. | 280/808 |
| 4,796,919 | 1/1989 | Linden | 280/808 |
| 4,832,367 | 5/1989 | Lisenby | 280/808 |

Under REFERENCES CITED, please change "Von Wimmerspeg" to -- Von Wimmersperg -- and "Kassi" to -- Kassai --.

Col. 2, line 5, please change "McKeevet" to -- McKeever --.
Col. 4, line 20, after "along" insert -- the --.
Col. 5, lines 16-17, please change "KELAR" to -- KEVLAR --.
Col. 6, line 13, after "restraint" please delete the -- . --.
Col. 7, line 25, after "area" please insert -- of --.

Signed and Sealed this

Eighteenth Day of October, 1994

Attest:

BRUCE LEHMAN

Attesting Officer  Commissioner of Patents and Trademarks